C. BUTLER.
ONION WEEDER.
APPLICATION FILED OCT. 10, 1921.
1,400,414.
Patented Dec. 13, 1921.
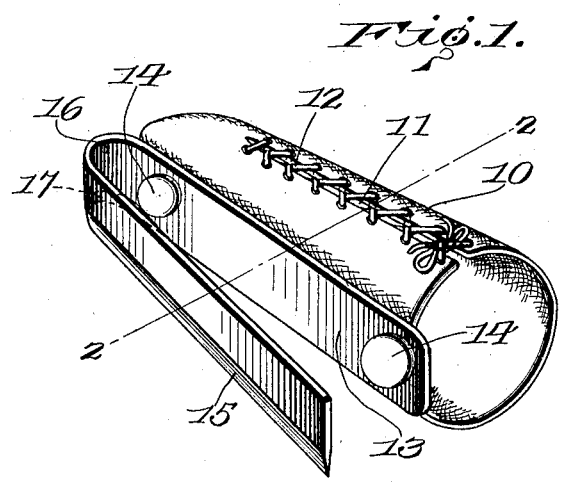
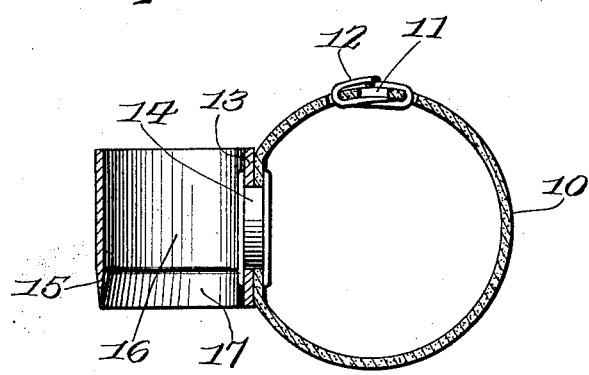
Inventor
Charles Butler
By
Attorney

UNITED STATES PATENT OFFICE.

CHARLES BUTLER, OF INDEPENDENCE, KANSAS.

ONION-WEEDER.

1,400,414.   Specification of Letters Patent.   Patented Dec. 13, 1921.

Application filed October 10, 1921. Serial No. 506,677.

*To all whom it may concern:*

Be it known that I, CHARLES BUTLER, a citizen of the United States, residing at Independence, in the county of Montgomery, State of Kansas, have invented certain new and useful Improvements in Onion-Weeders; and I do hereby declare the following to be a full, clear, and exact description of the invention, such as will enable others skilled in the art to which it appertains to make and use the same.

This invention relates to new and useful improvements in weeding tools and particularly to tools for removing weeds around onions.

One object of the invention is to provide a device adapted to be worn on the thumb of the user and which is provided with a peculiarly shaped knife for permitting the digging of weeds and grass which are close to the onion plants.

Other objects and advantages will be apparent from the following description when taken in connection with the accompanying drawing.

In the drawing:

Figure 1 is a perspective view of the onion weeder.

Fig. 2 is a transverse sectional view through the thumb stall and the knife blade on the line 2—2 of Fig. 1.

Referring particularly to the accompanying drawing 10 represents a stall which is adapted to be placed on the thumb of the hand of the operator, said stall being preferably formed from leather, but may be made of metal, canvas, or other suitable material. The stall is open longitudinally, at one side, as shown at 11, and has a lacing 12 engaged in holes therein, so as to permit proper adjustment to thumbs of different sizes.

A flat metal strip bent so as to have arms extending in divergent relation, is secured, by one of said arms, to the stall, by means of the rivets 14. The outer arm of the strip is in the form of a knife blade having one longitudinal edge sharpened at 15. The bight portion 16, which connects the arms is slightly wider than the remainder of each of the arms, the cutting edge of the blade arm being continued around said bight portion, as shown at 17.

It will be noted that the rear edge of the outer arm meets the adjacent end of the cutting edge 15 at approximately a right angle, thus producing a sharp cutting corner which the operator may dig into the soil to remove very small weeds which are close to the onions.

In the operation of the invention a stall is placed on the thumb of each hand of the operator with the knife blade directed away from the hand. Both hands are then placed adjacent the row of onion plants, at opposite sides thereof, and the devices so manipulated as to dig out the weeds and grass from the sides of the row. The two blades may be drawn along at the sides of the row, and the grass and weeds thus readily and effectively cut out of the soil. Should there be a larger weed or tuft of grass the operator simply digs down to the root of the weed or grass with the point of one of the blades and lifts the weed or grass out of the soil.

What is claimed is:

An onion weeder comprising a thumb stall, and a strip of metal bent intermediate its length to form a pair of divergent arms of approximately equal length connected by a curved bight portion, one of the arms being secured to the stall and extending longitudinally toward the open end thereof, the other arm and the bight portion having lower continuous cutting edges.

In testimony whereof, I affix my signature, in the presence of two witnesses.

CHARLES BUTLER.

Witnesses:
 J. M. ALTAFFER,
 HAL R. CLARK.